C. W. SALADEE.
Metallic Washers for Vehicles, &c.
No. 148,498.                                  Patented March 10, 1874.
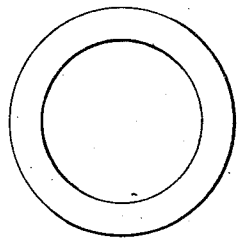
WITNESSES.                              INVENTOR.

UNITED STATES PATENT OFFICE.

CYRUS W. SALADEE, OF PITTSBURG, PENNSYLVANIA.

IMPROVEMENT IN METALLIC WASHERS FOR VEHICLES, &c.

Specification forming part of Letters Patent No. 148,498, dated March 10, 1874; application filed November 22, 1873.

*To all whom it may concern:*

Be it known that I, CYRUS W. SALADEE, of Pittsburg, in the State of Pennsylvania, have invented certain Improvements in Washers for Carriage-Axles, and other like purposes, of which the following is a specification embodying my invention:

The nature of my invention consists in the employment of a suitable ductile metal of any character which embraces, or can be so compounded as to embrace, a degree of ductility sufficient to prevent a ringing noise when used as a washer upon a carriage-axle, or for other like purposes, and yet hard enough to receive the strain and friction attending the use of such washers.

The washers now in general use for the purpose stated are made of either leather, rawhide, or prepared paper, and all alike are subject to the following objections, viz: First, either of the materials last above named permits the oil to thoroughly penetrate the entire body of the washer, thereby softening it to such a degree as to render it incapable of resisting the friction imposed for any considerable length of time, and thus requiring the washer to be renewed quite too often for either convenience or profit; second, as the oil penetrates the body of the washers there is, in consequence, a tendency to draw the oil away from the axle when in constant use, thereby requiring more frequent oiling than would be the case if this defect were not present; and, third, in proportion as the washer is softened by the oil it wears away, and the wheels soon make a rattling noise on the axle. On the other hand, a washer made of iron, or other hard and unyielding metal, would possess the quality of retaining the oil and of resisting the strain and friction better than the leather, rawhide, or paper washer, but the extreme hardness of such metal would, when in contact with the axle and box, create, when slightly worn, a ringing, rattling noise that would exclude the use of such metal for this purpose. I have discovered, however, that a washer composed of hardened lead will outwear any of the leather, rawhide, or paper washers now in use, and that they deaden the sound to such an extent as effectually to prevent that sounding, rattling noise so common in carriage-axles when the washers have become slightly worn. But experiments which I have made have demonstrated that this ductile-metal washer is greatly improved by compounding with the lead a small proportion of tin, zinc, antimony, or babbitt-metal, in such quantity as to stiffen or harden the lead to any degree, as circumstances may require, to prevent the washer from spreading or being crushed under the pressure and friction of the box.

For all general purposes I contemplate the manufacture of these washers from ductile metal composed of lead and babbitt-metal—two parts of the former and one of the latter.

I claim as my invention—

A metallic washer for vehicles and the like, composed of about one part babbitt-metal and two parts lead, substantially as and for the purpose set forth.

CYRUS W. SALADEE.

Witnesses:
 GAYLORD B. SALADEE,
 A. MOORE.